J. Slusser,
Lock Hinge,
No. 54,618.          Patented May 8, 1866.
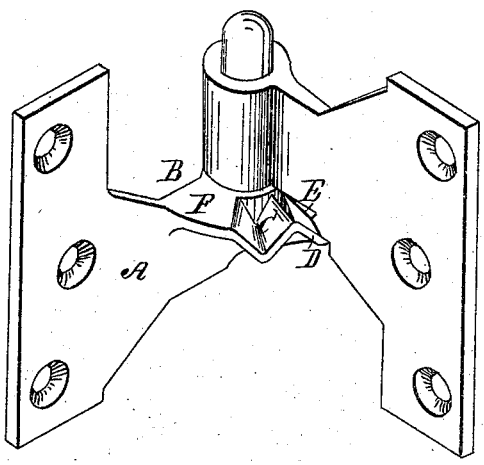
Fig. 1
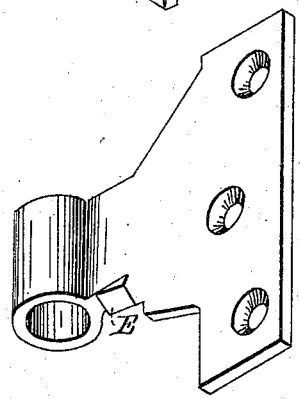
Fig. 2
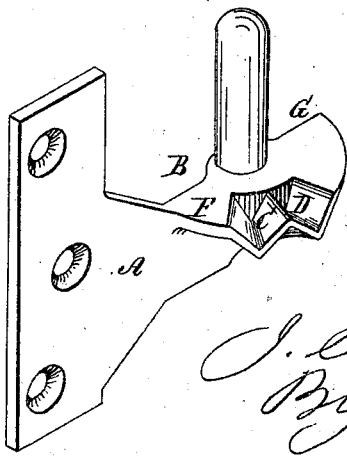
Witnesses;
James H. Layman
Geo. B. Nicholson
Inventor;
J. Slusser
By Knight Bros
Attys

UNITED STATES PATENT OFFICE.

JOSEPH SLUSSER, OF CINCINNATI, OHIO.

IMPROVEMENT IN SHUTTER-HINGES.

Specification forming part of Letters Patent No. 54,618, dated May 8, 1866.

*To all whom it may concern:*

Be it known that I, JOSEPH SLUSSER, of Cincinnati, Hamilton county, Ohio, have invented a new and useful Improvement in Shutter-Hinges; and I do hereby declare the following to be a full, clear, and exact description thereof, reference being had to the accompanying drawings, making part of this specification.

My invention relates to a hinge composed of two simple castings, whose cost and weight do not materially exceed those of the common form, the said hinge being capable of holding the shutter to the extended or to any desired bowed or partly-open position with sufficient force to resist the action of any ordinary current of wind or other disturbing agent, while at the same time such as to yield readily to an effort made to open or close the shutter by hand, or to such a current of wind as would endanger the shutter or hinge.

Figure 1 represents the half-open condition of a left-hand hinge embodying my invention. Fig. 2 shows the two members of the hinge detached.

The lower member, A, has a semicircular projection or half-collar, B, provided with two V-formed notches, C D, at angles with the screw-plate of forty-five and ninety degrees, respectively.

The upper member of the hinge has a V-formed tooth, E, which, when the shutter is closed, rests on the inner elevated portion, F, of the collar. When the shutter is one-fourth opened the tooth E occupies the notch C, and when one-half opened it occupies the notch D. When thrown entirely open the tooth E drops down outside of the other extremity, G, of the collar, so as to press the shutter snugly to the wall.

I claim herein as new and of my invention—

The self-locking shutter-hinge provided with the V-indented half-collar B C D, and locking-edge G on its lower member, and one V-tooth, E, on its upper member, constructed and arranged substantially as set forth.

In testimony of which invention I hereunto set my hand.

JOSEPH SLUSSER.

Witnesses:
GEO. H. KNIGHT,
JAMES H. LAYMAN.